United States Patent [19]

Riboud et al.

[11] Patent Number: 4,541,863

[45] Date of Patent: Sep. 17, 1985

[54] METHOD FOR THE TREATMENT OF PHOSPHURETTED SLAG

[75] Inventors: Paul-Victor Riboud; Christian Gatellier, both of Metz, France

[73] Assignee: Institut de Recherches de la Siderurgie Francaise, Saint-Germain-Laye, France

[21] Appl. No.: 615,694

[22] Filed: May 29, 1984

Related U.S. Application Data

[63] Continuation of Ser. No. 380,007, May 19, 1982, abandoned.

[30] Foreign Application Priority Data

May 22, 1981 [FR] France ................................ 81 10401

[51] Int. Cl.⁴ ............................................... C21B 3/04
[52] U.S. Cl. ......................................... 75/24; 423/155
[58] Field of Search .................. 75/24, 30; 423/155

[56] References Cited

U.S. PATENT DOCUMENTS

| | | | |
|---|---|---|---|
| 4,062,672 | 12/1977 | Kunicki et al. | 75/24 |
| 4,084,959 | 4/1978 | Yamamoto et al. | 75/24 |
| 4,185,997 | 1/1980 | Inoue et al. | 75/24 |

*Primary Examiner*—Melvyn J. Andrews
*Attorney, Agent, or Firm*—Michael J. Striker

[57] ABSTRACT

Process for the treatment of phosphuretted slag obtained by refining a molten bath, such as steel. The process according to the invention involves hot oxidizing the slag into which is blended, after refining, a pulverized solid adjuvant, strongly oxidizing and easily fusible upon contact with the slag. Among utilizable adjuvants, the carbonates of alkaline metals or alkaline earth metals are preferred, in particular sodium carbonate, which additionally, is a product currently utilized in the domain of the elaboration of metal, notably in iron metallurgy. The invention ensures a rapid passivation of the slag in stabilizing the phosphorus by forming phosphate and allowing in this manner the avoidance of the liberation of very toxic phosphenes which are produced naturally by cold hydrolysis.

8 Claims, No Drawings

METHOD FOR THE TREATMENT OF PHOSPHURETTED SLAG

This is a continuation of application Ser. No. 380,007, filed May 19, 1982, now abandoned.

BACKGROUND OF THE INVENTION

The invention concerns the treatment of phosphuretted slag obtained by refining a metallic bath.

It is known that the refining operation for melted metal, such as steel, consists notably in the elimination from the metallic bath of a determined quantity of dissolved elements such as phosphorus, sulfur, among others. One succeeds customarily by forming on the bath a slag for which the essential role is precisely to grow rich in these elements. It is likewise known that certain slag can be formed in this manner, if appropriate measures are not engaged in at the right time, which contain contaminating agents that are sometimes very harmful to man.

This is particularly the case with phosphuretted slag obtained by dephosphorylation of a metallic bath in reducing phase by means of the alkaline earths, such as calcium (see e.g. French Pat. No. 2,428,672-IRSID) or by which is compounded halogenated (see e.g. French Pat. No. 2,356,732-Nippon Steel).

It has been found, in effect, that such slag, rich in phosphorus, cold hydrolyzes upon simple contact with air to produce phosphines according to the reaction

$$M_3P_2 + 3H_2O \longrightarrow 3MO + 2PH_3$$

where M represents the alkaline earth utilized as dephosphorylating agent.

The phosphine being a very toxic gas, it is indispensable to stabilize the slag before it becomes hydrolyzed.

The known solution (French Pat. No. 2,356,732) involves hot oxidizing of the slag in an atmosphere enriched in oxygen. This is then carried by the phosphorus for formation of a very stable phosphate.

However, the reaction of a gas such as oxygen on a liquid refining slag always presents rather slow kinetics. Moreover, the practicality of the method is notably limited by the necessity of installing particular means in order to assure the blowing onto the slag of a gaseous oxygenated current. Additionally, it is imperative that the slag should be preliminarily isolated from the metallic bath in order to avoid its becoming oxidized or the taking on of phosphorus. In other respects, this is done by cooling the slag for a time. A temperature is then maintained by means of an oxidizing flame burner. However, it is advisable then to utilize a combustible such as gaseous CO in order to avoid that the combustion be accompanied by the formation of water vapor.

SUMMARY OF THE INVENTION

The present invention therefore is based upon the object of providing a simple and efficient solution to the problem of the passivation of a phosphuretted refining slag, which solution necessitates neither any particular installation nor preliminary metal-slag separation, and which rapidly brings about an inhibiting of noxious constituents.

To this end, the invention is based upon the object of providing a process for the treatment of a phosphuretted refining slag by hot oxidation, characterized by the incorporation therein of an easily fusible and strongly oxidizing solid adjuvant.

By "easily fusible" it is meant to be designated that the adjuvant be capable of easily melting upon contact with the slag in thermal equilibrium with the metallic bath at the bottom of the refining mass. In this regard it is recommended to employ adjuvants having a melting point below about 900° C.

Among the products satisfying the necessary specification it is preferred to utilize carbonates of alkaline metal or alkaline earths which are excellent oxidizers (such as $Na_2CO_3$, $MgCO_3$, $K_2CO_3$).

Among these, sodium carbonate ($Na_2CO_3$) is found to be particularly appropriate by reason of its low melting point (850° C. In other respects, the product is not expensive and is commercially available in great quantities. Moreover, it does not necessitate any particular precaution either with regard to the conditioning or the handling, and its chemical properties upon melting lead to a siderurgically utilizable product.

Apart from this, the carbonates present, in relation to other compounds capable of being utilized, the advantage of forming carbon oxide (CO) upon hot decomposition. This gas, which then emerges from the slag, burns in the atmosphere, releasing calories which tend to reduce the cooling effect due to the provision of cold matter into the slag.

It should be well understood that the essential problem behind the invention was to attain realization of an intimate contact—as intimate as possible—between the oxygen and the phosphorus in the slag. To this effect, the inventors have come to the idea of utilizing a fixing agent for oxygen, capable of instantly freeing itself, that is to say, capable of forming at low temperature a liquid phase of low viscosity which infiltrates into the anfractuosities of the phosphuretted slag.

It should also be understood that the carbonates of the alkaline metals or the alkaline earths, preferably $Na_2CO_3$, respond to such exigencies as are shown by the following elementary reactions:

$$Na_2CO_3 \xrightarrow{T(850°)} Na_2O + CO + \tfrac{1}{2}O_2$$

The produced oxygen becomes carried on the phosphorus according to

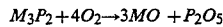

$$M_3P_2 + 4O_2 \rightarrow 3MO + P_2O_5$$

The passivation of the slag in the reaction mass may be set forth thus:

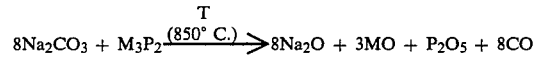

$$8Na_2CO_3 + M_3P_2 \xrightarrow{T(850° C.)} 8Na_2O + 3MO + P_2O_5 + 8CO$$

Implementation of the invention poses no particular difficulties.

The sodium carbonate is presented preferably in pulverized form so as to facilitate the fusion. It can be applied delivered loose or in the condition of small packets. Whatever the mode of delivery, according to customary practice, it is introduced onto the slag at the end of the refining.

The slag may or may not have been preliminarily separated from the metallic bath.

In the affirmative case, the carbonate can be cast in small packets onto the slag without any particular precaution.

When there has been no preliminary separation, it is preferable, for the reasons set forth above, to sprinkle the carbonate onto the slag in such manner as to not overly expose the metallic bath or provoke an agitation thereof.

The quantities to be brought into play depend, as should be well understood, upon the quantity of phosphorus transferred to the slag during the course of the refining. The inventors have been able to show that the quantity Q of sodium carbonate to be employed is a function of the diminution D of the extent of phosphorus in the bath during the course of the refining, according to the relation:

$$7.5 \times 10^3 \times D \leq Q \leq 15 \times 10^3 \times D$$

wherein Q is expressed in kg per 100 tons of metal (kg/100 tm) and D is in percent.

The experience gleaned from a steel bath, the phosphorus content of which has gone, in the course of the refining by injection of calcium, from an initial value of 0.025% to a final value of 0.015% (D+0.010%), has shown, in accordance with the above relationship, that the quantity of $Na_2CO_3$ to be utilized runs from between about 75 and 150 kg/100 tm. In other words, the weight relationship between the quantity of $Na_2CO_3$ to be added to the slag and the quantity of initially contained calcium/-phosphorus compound ($Ca_3P_2$) in the slag, is situated between about 2.5 and 5.

Other metallic baths, refinable as appropriate, can be likewise treated in analogous manner with likewise determined adjuvant/refining agent relationship.

The difference, represented by a coefficient of 2 between the extreme values, is explained by the fact that the atmospheric oxygen also participates in the passivation of the slag. Its contribution, which to be sure remains limited, is augmented in dependence on its partial pressure in the atmosphere above the slag and upon the time which is prescribed for effecting the treatment of the slag.

Between the above-mentioned limiting values, the quantity of adjuvant to be utilized thus becomes determined as a function of these conditions. Aside from this, it has been observed to start with a quantity of adjuvant on the order of about 150 kg/100 tm, to rapidly stabilize the slag, the same in the presence of a neutral atmosphere.

On the other hand, outside of the lower limit of 75 kg/100 tm, the passivation no longer appears to be capable of being correctly guaranteed with regard to the acceptable delay, this too even under an atmosphere strongly enriched in oxygen.

It will be understood that each of the elements described above, or two or more together, may also find a useful application in other types of metal treatments differing from the types described above.

While the invention has been illustrated and described as embodied in a method for the treatment of phosphuretted slag, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Process for the hot oxidation treatment of alkaline earth phosphide bearing slag obtained by refining a metal bath having undergone a dephosphorylation treatment in reducing phase by an alkaline earth metal, consisting of oxidizing said alkaline earth phosphide by adding to said slag an easily fusable and strongly oxidizing solid adjuvant.

2. Process according to claim 1, comprising adding an adjuvant with a melting point below about 900° C.

3. Process according to claim 1, comprising adding as adjuvant carbonate of alkali or alkaline earth metal.

4. Process according to claim 3, wherein said alkali or alkaline earth metal is Na, K or Mg.

5. Process according to claim 4, wherein said adjuvant is sodium carbonate.

6. Process according to claim 1, further comprising before said adding, conditioning said adjuvant into pulverized form.

7. Process according to claim 5, employing a quantity Q of adjuvant depending from the diminution D of the extent of phosphorus in the said bath during the course of the said refining according to the double relation $$7500 \; D \leq Q \leq 15000 \; D$$

wherein Q is expressed in kg per 100 tons of metal and D is in %.

8. The process according to claim 1, for the treatment of calcium phosphide bearing slag, wherein said slag is obtained by refining a metal bath having undergone a dephosphorylation treatment in reducing phase by calcium.

* * * * *